US011900851B2

(12) United States Patent
Ha et al.

(10) Patent No.: US 11,900,851 B2
(45) Date of Patent: Feb. 13, 2024

(54) DISPLAY DEVICE AND METHOD OF DRIVING THE SAME

(71) Applicant: Samsung Display Co., Ltd., Yongin-Si (KR)

(72) Inventors: Tae Seok Ha, Yongin-si (KR); Woon Rok Jang, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/134,037

(22) Filed: Apr. 13, 2023

(65) Prior Publication Data

US 2024/0021130 A1 Jan. 18, 2024

(30) Foreign Application Priority Data

Jul. 13, 2022 (KR) ........................ 10-2022-0086523

(51) Int. Cl.
*G09G 3/20* (2006.01)
*G09G 3/32* (2016.01)

(52) U.S. Cl.
CPC ......... *G09G 3/2007* (2013.01); *G09G 3/2096* (2013.01); *G09G 3/32* (2013.01); *G09G 2300/0842* (2013.01); *G09G 2310/08* (2013.01); *G09G 2320/0257* (2013.01); *G09G 2320/0666* (2013.01); *G09G 2340/16* (2013.01); *G09G 2360/12* (2013.01)

(58) Field of Classification Search
None
See application file for complete search history.

(56) References Cited

U.S. PATENT DOCUMENTS

| | | | | |
|---|---|---|---|---|
| 7,978,211 B2 * | 7/2011 | Chen | G09G 3/3648 | 345/89 |
| 8,212,756 B2 * | 7/2012 | Shiomi | G09G 3/3648 | 345/204 |
| 8,605,121 B2 * | 12/2013 | Chu | G09G 3/3648 | 348/674 |
| 8,937,632 B2 * | 1/2015 | Li | G09G 3/2022 | 345/77 |
| 2007/0063947 A1 * | 3/2007 | Kang | G09G 3/3611 | 345/89 |

(Continued)

FOREIGN PATENT DOCUMENTS

KR 10-0570995 B1 4/2006

*Primary Examiner* — Matthew Yeung
(74) *Attorney, Agent, or Firm* — Innovation Counsel LLP

(57) ABSTRACT

A display device includes a timing controller and a grayscale unit electrically connected to the timing controller. The timing controller may generate first data for a pixel for a previous frame and first data for the pixel for a current frame. The grayscale unit may output a black-corresponding grayscale as second data for the pixel when a predetermined condition is satisfied. The black-corresponding grayscale corresponds to black. The predetermined condition may include that the first data for the pixel for the previous frame is in a predetermined second gray scale range and that the first data for the pixel for the current frame is in a predetermined first grayscale range. The predetermined first grayscale range may be between the predetermined second grayscale range and the black-corresponding grayscale.

20 Claims, 6 Drawing Sheets

(56) References Cited

U.S. PATENT DOCUMENTS

| | | | | |
|---|---|---|---|---|
| 2010/0079473 | A1* | 4/2010 | Choi | G09G 3/3648 345/545 |
| 2010/0080459 | A1* | 4/2010 | Dai | G06T 5/009 382/170 |
| 2014/0292793 | A1* | 10/2014 | Lai | G09G 5/10 345/589 |
| 2016/0173862 | A1* | 6/2016 | Huang | G09G 3/2007 348/51 |
| 2018/0261181 | A1* | 9/2018 | Lim | G09G 5/02 |
| 2019/0114973 | A1* | 4/2019 | Zha | G09G 3/3406 |
| 2021/0174762 | A1* | 6/2021 | Sun | G09G 3/2007 |
| 2021/0210031 | A1* | 7/2021 | Kang | G09G 3/3413 |

* cited by examiner

<DISPLAY PERIOD>

DISPLAY DEVICE AND METHOD OF DRIVING THE SAME

CROSS-REFERENCE TO RELATED APPLICATION

This application claims priority to Korean Patent Application No. 10-2022-0086523, filed on Jul. 13, 2022, and all the benefits accruing therefrom under 35 U.S.C. § 119, the content of which in its entirety is herein incorporated by reference.

BACKGROUND

1. Field

The present disclosure generally relates to a display device and a method of driving the display device.

2. Description of the Related Art

Display devices may be included in electronic devices for displaying images and/or information. Modern display devices include liquid crystal display devices and organic light emitting display devices.

A display device may include pixels. The pixels may include light emitting elements and driving transistors. For displaying an image, the display device may control luminance levels of the light emitting elements by controlling amounts of current supplied to the light emitting elements using the driving transistors. An unwanted afterimage may be displayed due to hysteresis of the driving transistors when the display device displays a low grayscale image.

SUMMARY

Embodiments may be related to a display device and a method of driving the display device that may prevent or reduce conspicuous unwanted afterimages.

According to an embodiment of the disclosure, a display device includes a timing controller configured to generate first data by correcting input data input from an outside, and a grayscale corrector configured to compare first data of a current frame with first data of a previous frame and output second data corresponding to a comparison result. When a condition in which the first data of the previous frame corresponding to a specific pixel is a high grayscale and the first data of the current frame corresponding to the specific pixel is a low grayscale is satisfied, the grayscale corrector generates the second data by changing the first data corresponding to the low grayscale into data of a black grayscale.

According to an embodiment, the low grayscale includes a first grayscale (1 Gray).

According to an embodiment, the high grayscale includes grayscales other than the low grayscale.

According to an embodiment, the grayscale corrector outputs the first data of the current frame as the second data when the condition is not satisfied.

According to an embodiment, the grayscale corrector includes a memory configured to store the first data of the previous frame, a grayscale determiner configured to receive the first data of the current frame from the timing controller, receive the first data of the previous frame from the memory, and determine whether the condition is satisfied, and a grayscale changer configured to output the second data including the data of the black grayscale or the first data of the current frame as the second data in response to a determination result of the grayscale determiner.

According to an embodiment, the grayscale determiner includes a first color grayscale determiner configured to determine the condition using a first high grayscale corresponding to a first color and a first low grayscale corresponding to the first color, a second color grayscale determiner configured to determine the condition using a second high grayscale corresponding to a second color and a second low grayscale corresponding to the second color, and a third color grayscale determiner configured to determine the condition using a third high grayscale corresponding to a third color and a third low grayscale corresponding to the third color.

According to an embodiment, grayscales included in the first high grayscale, the second high grayscale, and the third high gray scale are set differently.

According to an embodiment, the first color is red, the second color is set to green, and a first lowest grayscale included in the first high grayscale is set to a grayscale higher than a second lowest grayscale included in the second high grayscale.

According to an embodiment, the third color is set to blue, and a third lowest grayscale included in the third high grayscale is set to a grayscale lower than the second lowest grayscale.

According to an embodiment, the grayscale corrector outputs the first data of the current frame to be supplied to pixels of a specific color as the second data regardless of the condition.

According to an embodiment, the specific color is red.

According to an embodiment, the display device further includes a load determiner configured to determine a load of the current frame using the first data of the current frame.

According to an embodiment, the grayscale corrector outputs the first data of the current frame as the second data when the load determined by the load determiner is equal to or greater than a predetermined threshold value.

According to an embodiment, the threshold value is set between 50% and 80%.

According to an embodiment, the display device further includes a frequency determiner configured to determine a driving frequency of the current frame.

According to an embodiment, the grayscale corrector outputs the first data of the current frame as the second data when the frequency determiner determines that the current frame has a low frequency.

According to an embodiment, the low frequency is a frequency of 100 Hz or less.

According to an embodiment of the disclosure, a method of driving a display device includes generating first data by correcting input data input from an outside, and generating second data by comparing first data of a current frame with first data of a previous frame. Generating the second data includes generating the second data by changing first data corresponding to a low grayscale to data of a black grayscale when the first data of the previous frame corresponding to a specific pixel is a high grayscale and the first data of the current frame corresponding to the specific pixel is the low grayscale.

According to an embodiment, the low grayscale includes a first grayscale (1 Gray).

According to an embodiment, the first data of the current frame is output as the second data when a driving frequency is set to 100 Hz or less or when it is determined that a load of the current frame is 80% or more.

An embodiment may be related to a display device. The display device may include a timing controller and a grayscale unit electrically connected to the timing controller. The timing controller may generate first data for a pixel for a previous frame and first data for the pixel for a current frame. The grayscale unit may output a black-corresponding grayscale as second data for the pixel when a predetermined condition is satisfied. The black-corresponding grayscale corresponds to black. The predetermined condition may include that the first data for the pixel for the previous frame is in a predetermined second grayscale range and that the first data for the pixel for the current frame is in a predetermined first grayscale range. The predetermined first grayscale range may be between the predetermined second grayscale range and the black-corresponding grayscale.

The predetermined first grayscale range may include a first grayscale immediately next to the black grayscale.

The minimum grayscale of the predetermined second grayscale range may be greater than the maximum grayscale of the predetermined first grayscale range.

The grayscale unit may output the first data for the pixel for the current frame as the second data for the pixel when the predetermined condition is not satisfied.

The grayscale unit may include the following elements: a memory for storing the first data for the pixel for the previous frame; a grayscale determiner for receiving the first data for the pixel for the current frame from the timing controller, receiving the first data for the pixel for the previous frame from the memory, and determining whether the predetermined condition is satisfied; and a grayscale output unit for outputting the second data for the pixel in response to a determination result of the gray scale determiner.

The grayscale determiner may include the following elements: a first color grayscale determiner for determining whether a predetermined first-color condition is satisfied using a predetermined second first-color grayscale range corresponding to a first color and using a predetermined first first-color grayscale range corresponding to the first color and lower than the predetermined second first-color grayscale range; a second color grayscale determiner for determining whether a predetermined second-color condition is satisfied using a predetermined second second-color grayscale range corresponding to a second color and using a predetermined first second-color grayscale range corresponding to the second color and lower than the predetermined second second-color grayscale range; and a third color grayscale determiner for determining whether a predetermined third-color condition is satisfied using a predetermined second third-color grayscale range corresponding to a third color and using a predetermined first third-color grayscale range corresponding to the third color and lower than the predetermined second third-color grayscale range.

The predetermined second first-color grayscale range, the predetermined second second-color grayscale range, and the predetermined second third-color grayscale range may be different from each other.

The first color may be red. The second color may be green. A lowest grayscale of the predetermined second first-color grayscale range may be higher than a lowest grayscale of the predetermined second second-color grayscale range.

The third color may be blue. A lowest grayscale of the predetermined second third-color grayscale range may be lower than the lowest grayscale of the predetermined second second-color grayscale range.

When the pixel is configured to display a predetermined color, the grayscale unit may output the first data for the pixel for the current frame as the second data for the pixel regardless of whether the predetermined condition is satisfied.

The predetermined color may be red.

The display device may include a load determiner. The load determiner may determine a load of the current frame using the first data for the pixel for the current frame.

The grayscale unit may output the first data for the pixel for the current frame as the second data for the pixel when the load determiner determines that the load of the current frame is equal to or greater than a predetermined threshold value.

The predetermined threshold value may be in a range of 50% to 80%.

The display device may include a frequency determiner. The frequency determiner may determine a driving frequency of the current frame.

The grayscale unit may output the first data for the pixel for the current frame as the second data for the pixel when the frequency determiner determines that the driving frequency of the current frame is equal to or lower than a predetermined threshold frequency.

The predetermined threshold frequency may be 100 Hz.

An embodiment may be related to a method of driving a display device. The method may include the following steps: generating, using a timing controller, first data for a pixel for a previous frame and first data for the pixel for a current frame; and outputting, using a gray scale unit electrically connected to the timing controller, a black-corresponding grayscale as second data for the pixel when a predetermined condition is satisfied. The black-corresponding grayscale corresponds to black. The predetermined condition may include that the first data for the pixel for the previous frame is in a predetermined second grayscale range and that the first data for the pixel for the current frame is in a predetermined first grayscale range. The predetermined first grayscale range may be between the predetermined second grayscale range and the black-corresponding grayscale.

The predetermined first grayscale range includes a first grayscale immediately next to the black grayscale.

The method may include the following steps: determining at least one of a driving frequency of the current frame and a load of the current frame; and outputting the first data for the pixel for the current frame as the second data for the pixel when the driving frequency of the current load is 100 Hz or less or when the load of the current frame is 80% or more.

According to embodiments, data of the black grayscale may be supplied when a display device displays a low grayscale image immediately after displaying a high grayscale image. Advantageously, an unwanted conspicuous afterimage may be prevented.

DETAILED DESCRIPTION

Figure 1:
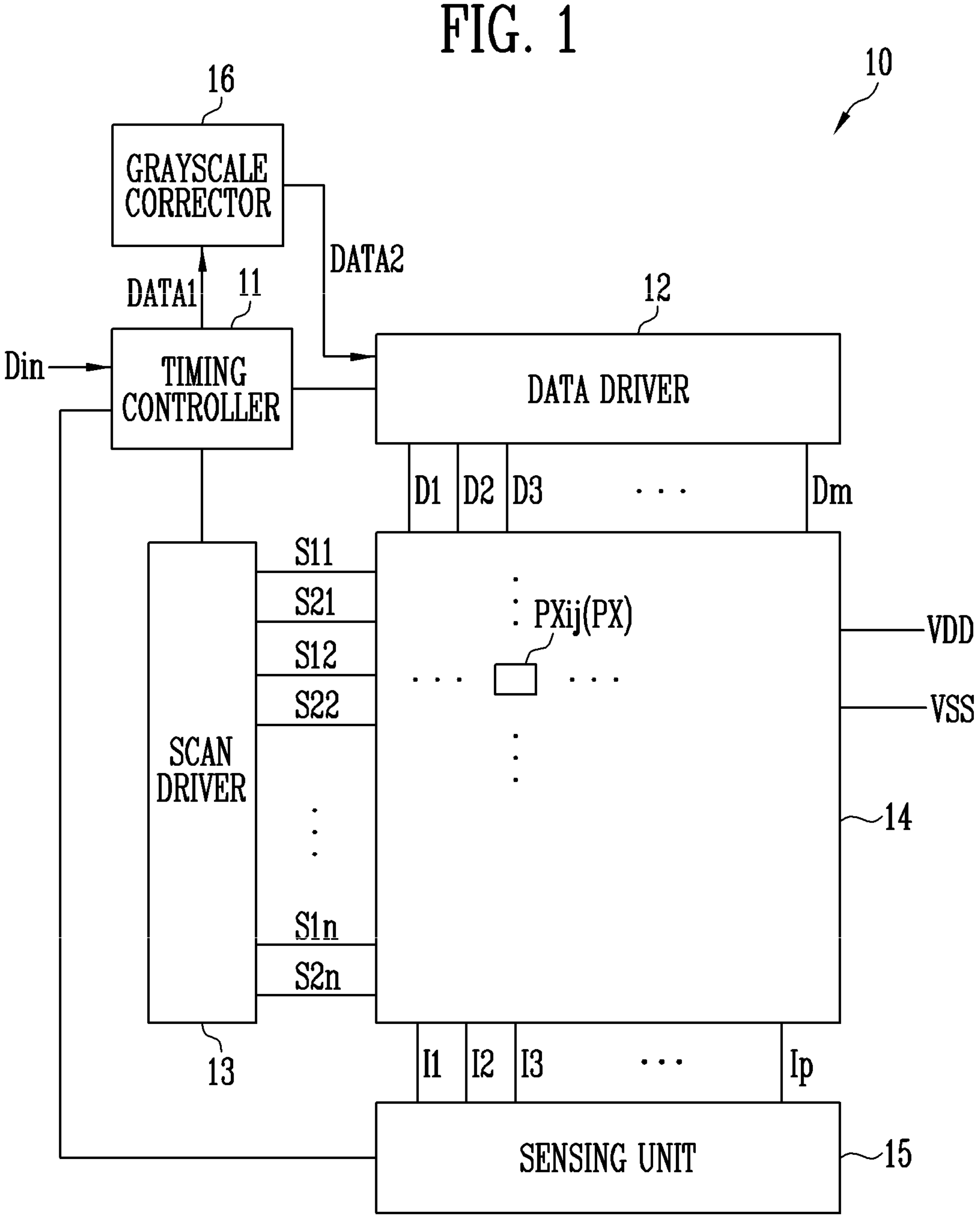
FIG. 1 is a diagram illustrating a display device according to an embodiment.

Examples of embodiments are described with reference to the accompanying drawings. Practical embodiments may be implemented in various ways and are not limited to the described embodiments.

In the application, the same or similar elements may be denoted by the same reference numerals.

Although the terms "first," "second," etc. may be used to describe various elements, these elements should not be limited by these terms. These terms may be used to distinguish one element from another element. A first element may be termed a second element without departing from teachings of the disclosure. The description of an element as a "first" element may not require or imply the presence of a second element or other elements. The terms "first," "second," etc. may be used to differentiate different categories or sets of elements. For conciseness, the terms "first," "second," etc. may represent "first-category (or first-set)," "second-category (or second-set)," etc., respectively.

The term "connect" may mean "directly connect" or "indirectly connect." The term "connect" may mean "mechanically connect" and/or "electrically connect." The term "connected" may mean "electrically connected" or "electrically connected through no intervening transistor." The term "insulate" may mean "electrically insulate" or "electrically isolate." The term "conductive" may mean "electrically conductive." The term "drive" may mean "operate" or "control." The term "grayscale corrector" may mean "grayscale unit." The term "grayscale changer" may mean "grayscale output unit."

FIG. 1 is a diagram illustrating a display device according to an embodiment.

Referring to FIG. 1, the display device 10 includes a timing controller 11, a data driver 12, a scan driver 13, a pixel unit 14, a sensing unit 15, and a grayscale corrector 16 (or grayscale unit 16).

The timing controller 11 receives input data Din and control signals corresponding to each frame from an external processor/device. The external processor/device may include at least one of a graphics processing unit (GPU), a central processing unit (CPU), and an application processor (AP).

The timing controller 11 generates first data DATA1 using the input data Din, and supplies the first data DATA1 to the grayscale corrector 16. The timing controller 11 may correct the input data Din in response to a threshold voltage of a driving transistor included in a pixel PX and/or deterioration information of a light emitting element. The timing controller 11 may correct the input data Din in response to a light measurement result of the pixel unit 14 measured during a process. The timing controller 11 may generate the first data DATA1 by correcting the input data Din using one or more known methods. The timing controller 11 may provide control signals suitable for each of the data driver 12, the scan driver 13, and the sensing unit 15.

During a display period, the data driver 12 may generate data signals (or data voltages) to be supplied to data lines D1, D2, D3 to Dm (wherein "m" is a natural number) using second data DATA2 from the grayscale corrector 16 and control signals supplied from the timing controller 11. The data driver 12 may supply the data signals to the data lines D1 to Dm in a pixel row. A pixel row includes pixels connected to the same scan line. During a sensing period, the data driver 12 may supply a reference voltage to the data lines D1 to Dm.

The scan driver 13 may supply first scan signals to first scan lines S11, S12 to S1*n* (wherein "n" is a natural number) and may supply second scan signals to second scan lines S21, S21 to S2*n* in response to control signals from the timing controller 11.

The scan driver 13 may sequentially supply first scan signals having a gate-on voltage (or a turn-on level) to the first scan lines S11 to S1*n*. The scan driver 13 may sequentially supply second scan signals having a gate-on voltage to the second scan lines S21 to S2*n*. In FIG. 1, one scan driver 13 drives the first scan lines S11 to S1*n* and the second scan lines S21 to S2*n*. The first scan lines S11 to S1*n* and the second scan lines S21 to S2*n* may receive scan signals from different scan drivers.

During the display period, the sensing unit 15 may supply a voltage of initialization power to sensing lines I1, 12, 13 to Ip (wherein "p" is a natural number). During the sensing period, the sensing unit 15 may receive a sensing voltage from the pixels PX connected to the sensing lines I1 to Ip. The sensing voltage may include and/or may be related to the threshold voltage of the driving transistor included in each of the pixels PX and/or the deterioration information of the light emitting element.

The pixel unit 14 includes the pixels PX. The pixels PX receive data signals for displaying an image. Each pixel PX may be connected to a corresponding data line, a scan line, and a sensing line. The pixels PX may receive voltages of first power VDD and second power VSS from an external source. The first power VDD may be a voltage higher than that of the second power VSS.

The grayscale corrector 16 may receive the first data DATA1 in a frame unit, and may generate the second data DATA2 using the first data DATA1. The second data DATA2 may be set the same as the first data DATA1. At least a portion of the second data DATA2 may be generated by changing data in the first data DATA1 for one or more specific pixels into data of a black grayscale (black-corresponding or black-representing grayscale) that corresponds to and/or represents black.

The grayscale corrector 16 may compare first data DATA1 of a current frame with first data DATA1*p* (shown in FIG. 4) of a previous frame, and generate the second data DATA2 in response to a comparison result. When the first data DATA1*p* of the previous frame corresponding to a specific pixel has a high grayscale and the first data DATA1 of the current frame corresponding to the specific pixel has a low grayscale, the grayscale corrector 16 may generate the second data by changing the low grayscale data in the first data corresponding to the specific pixel to the black grayscale data.

The grayscale corrector 16 may be implemented as software and/or hardware. In FIG. 1, the grayscale corrector 16 is positioned outside the timing controller 11. At least a partial configuration of the grayscale corrector 16 may be positioned inside the timing controller 11.

Figure 2:
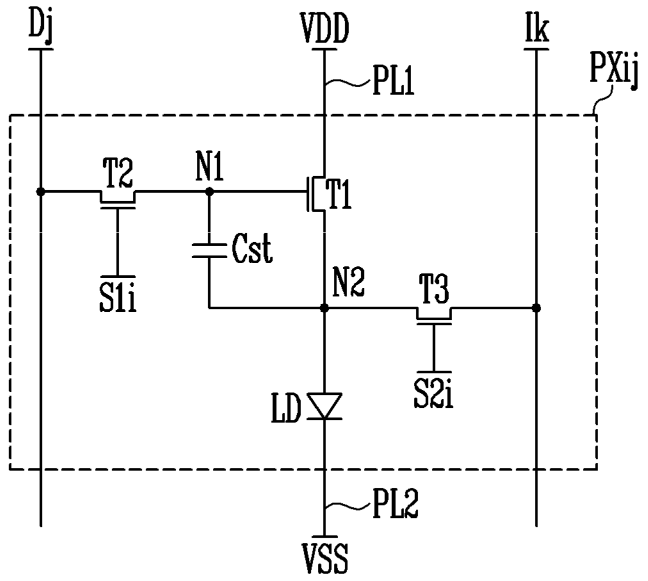
FIG. 2 is a diagram illustrating a pixel according to an embodiment.

FIG. 2 is a diagram illustrating a pixel according to an embodiment. FIG. 2 illustrates a pixel PXij in an i-th pixel row and in a j-th pixel column (wherein "i" and "j" are natural numbers).

The pixel PXij may include transistors T1 to T3, a storage capacitor Cst, and a light emitting element LD.

The light emitting element LD may be connected between a first power line PL1 (to which the first power VDD is supplied) and a second power line PL2 (to which the second power VSS is supplied). The first electrode (for example, an anode electrode) of the light emitting element LD may be connected to the first power line PL1 via a second node N2 and the first transistor T1, and a second electrode (for example, a cathode electrode) of the light emitting element LD may be connected to the second power line PL2. The light emitting element LD may emit light with luminance corresponding to a driving current supplied from the first transistor T1.

The voltage of the first power VDD and the voltage of the second power VSS may have a predetermined potential difference so that the light emitting element LD emits light. The second power VSS may have a voltage lower than that of the first power VDD.

The light emitting element LD may be an organic light emitting diode. The light emitting element LD may be an inorganic light emitting diode such as a micro light emitting diode (LED) or a quantum dot light emitting diode. The light emitting element LD may include both an organic material and an inorganic material. In FIG. 2, the pixel PX includes a single light emitting element LD. The pixel PX may include a plurality of light emitting elements, and the light emitting elements may be connected in series, in parallel, or in series-parallel with each other.

The transistors T1, T2, and T3 may be N-type transistors. The transistors T1, T2, and T3 may be P-type transistors. The transistors T1, T2, and T3 may include at least an N-type transistor and at least a P-type transistor. For a P-type transistor, an amount of current increases when a voltage difference between a gate electrode and a source electrode increases in a negative direction. For an N-type transistor, an amount of current increases when a voltage difference between a gate electrode and a source electrode increases in a positive direction.

The transistors T1, T2, and T3 may include one or more of a thin film transistor (TFT), a field effect transistor (FET), and a bipolar junction transistor (BJT).

The first transistor T1 is connected between the first power line PL1 and the second node N2. A gate electrode of the first transistor T1 is connected to a first node N1. The first transistor T1 controls an amount of current supplied from the first power VDD to the second power VSS via the light emitting element LD in response to a voltage of the first node N1. The first transistor T1 may be referred to as a driving transistor.

The second transistor T2 is connected between the data line Dj and the first node N1. A gate electrode of the second transistor T2 is connected to a first scan line S1*i*. The second transistor T2 is turned on when a first scan signal is supplied to the first scan line S1*i* to electrically connect the data line Dj and the first node N1.

The third transistor T3 is connected between the second node N2 and a sensing line Ik (wherein "k" is a natural number). A gate electrode of the third transistor T3 is connected to a second scan line S2*i*. The third transistor T3 is turned on when a second scan signal is supplied to the second scan line S2*i* to electrically connect the sensing line Ik and the second node N2.

The storage capacitor Cst is connected between the first node N1 and the second node N2. The storage capacitor Cst stores a voltage corresponding to a difference between the first node N1 and the second node N2.

Figure 3:
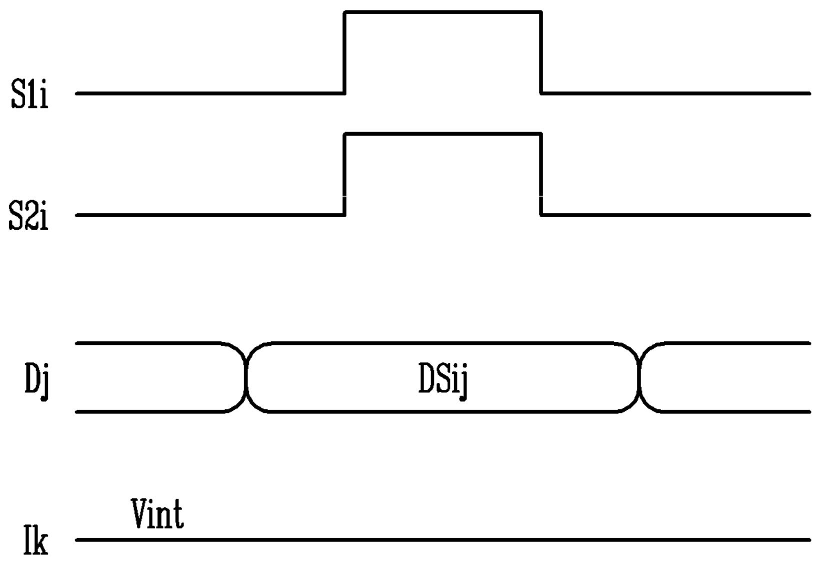
FIG. 3 is a waveform diagram illustrating a method of driving a pixel during a display period according to an embodiment.

FIG. 3 is a waveform diagram illustrating a method of driving the pixel during the display period according to an embodiment.

Referring to FIG. 1, FIG. 2, and FIG. 3, during the display period, the voltage of the initialization power Vint is supplied to the sensing line Ik. During the display period, the first scan signal is supplied to the first scan line S1*i*, and the second scan signal is supplied to the second scan line S2*i*.

When the first scan signal is supplied to the first scan line S1*i*, the second transistor T2 is turned on. When the second transistor T2 is turned on, a data signal DSij from the data line Dj is supplied to the first node N1. When the second scan signal is supplied to the second scan line S2*i*, the third transistor T3 is turned on.

When the third transistor T3 is turned on, the voltage of the initialization power Vint is supplied from the sensing line Ik to the second node N2. At this time, a voltage corresponding to a voltage difference between a voltage of the data signal DSij and the voltage of the initialization power Vint is stored in the storage capacitor Cst.

After the voltage corresponding to the data signal DSij is stored in the storage capacitor Cst, the supply of the first scan signal to the first scan line S1*i* is stopped, the second transistor T2 is turned off, the supply of the second scan signal to the second scan line S2*i* is stopped, and the third transistor T3 is turned off. Thereafter, the first transistor T1 supplies a current corresponding to the voltage stored in the storage capacitor Cst to the light emitting element LD. The luminance of the light emitting element LD may be determined according to an amount of current supplied from the first transistor T1 to the light emitting element LD.

During the sensing period, a reference voltage may be supplied to the data line Dj, a current corresponding to the reference voltage may be supplied from the first transistor T1 to the second node N2, and thus a sensing voltage may be applied to the second node N2. During the sensing period, the third transistor T3 may be set to a turn-on state, and thus the sensing voltage may be supplied to the sensing unit 15 via the sensing line Ik. The sensing unit 15 may detect the threshold voltage of the first transistor T1 and/or the deterioration information of the light emitting element LD using the sensing voltage. The timing controller 11 may correct the input data Din using the threshold voltage of the first transistor T1 and/or the deterioration information of the light emitting element LD detected by the sensing unit 15.

Figure 4:
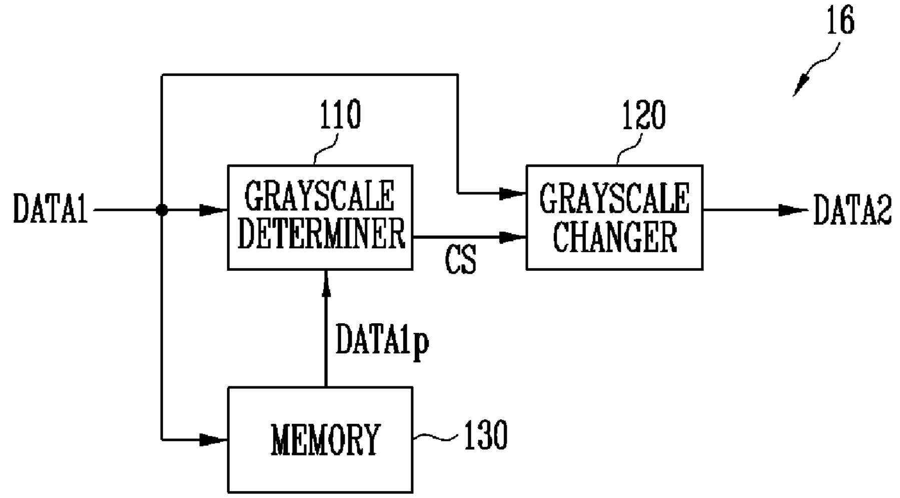
FIG. 4 is a diagram illustrating a grayscale corrector according to an embodiment.

FIG. 4 is a diagram illustrating a grayscale corrector (or grayscale unit) according to an embodiment.

Referring to FIG. 4, the grayscale corrector 16 (or grayscale unit 16) may include a grayscale determiner 110, a grayscale changer 120 (or grayscale output unit 120), and a memory 130.

The memory 130 may store the first data DATA1*p* of the previous frame. For example, when the current frame is a yth frame (wherein "y" is a natural number), the first data DATA1*p* of a (y−1)th frame may be stored in the memory 130. The first data DATA1*p* of the previous frame stored in the memory 130 may be updated per frame. When the current frame is a (y+1)th frame, the memory 130 may store the first data DATA1 of the yth frame as the first data DATA1$p$ of the previous frame.

The grayscale determiner 110 may compare the first data DATA1 for a pixel for the current frame (for example, the yth frame) with the first data DATA1$p$ for the pixel for the previous frame, and may supply a control signal CS corresponding to a comparison result to the grayscale changer 120. The grayscale determiner 110 receives the first data DATA1 of the current frame from the timing controller 11 and receives the first data DATA1$p$ of the previous frame from the memory 130.

The grayscale determiner 110 may compare the first data DATA1 of the current frame with the first data DATA1$p$ of the previous frame for each pixel. The grayscale determiner 110 may determine whether a predetermined condition in which the first data DATA1$p$ for the pixel for the previous frame is of a high grayscale (i.e., in a predetermined second grayscale range) and the first data DATA1 for the pixel for the current frame is of a low grayscale (i.e., in a predetermined first grayscale range between the black grayscale and the predetermined second grayscale range) is satisfied. When the above-described condition is satisfied, the grayscale determiner 110 may supply a predetermined control signal CS to the grayscale changer 120.

The grayscale changer 120 may generate the second data DATA2 using the first data DATA1 in response to the control signal CS of the grayscale determiner 110, and may supply the generated second data DATA2 to the data driver 12. When the above-mentioned condition is satisfied, the gray scale changer 120 may generate the second data DATA2 by changing low grayscale data to be supplied to the specific pixel to black data. Given that the high grayscale is displayed in the previous frame and that the low grayscale is changed to the black grayscale for the current frame, an afterimage may be prevented or may be inconspicuous. For a pixel that does not satisfy the above-mentioned condition, the grayscale changer 120 may supply the first data DATA1 of the current frame as the second data DATA2 to the data driver 12.

The low grayscale data (or grayscale data in a first/low grayscale range) may be in a grayscale range including 1 grayscale (1 Gray), and the high grayscale data (or grayscale data in a second/high grayscale range) may be in a grayscale range including the remaining grayscales. The grayscale(s) included in the low/first grayscale range may be set according to the resolution of a display panel, a material of the light emitting element, and the like. The grayscale(s) included in the low/first grayscale range may be experimentally determined for a display panel.

The grayscale corrector 16 may generate the second data DATA2 using the first data DATA1 output from the timing controller 11. The timing controller 11 may generate the first data DATA1 using the input data Din as well as using additional information such as deterioration information of the driving transistor (that is, the first transistor T1 of FIG. 2) and optical correction information.

If the grayscale corrector 16 generates the second data DATA2 simply using the input data Din, the image quality may be unsatisfactory. For improving image quality, data of 1 grayscale (1 Gray) to be supplied to a predetermined pixel in the input data Din may be changed to data of 2 grayscale (2 Gray) during a correction process of the timing controller 11. The grayscale corrector 16 may generate the second data DATA2 using the first data DATA1 output from the timing controller 11.

The grayscale determiner 110 and/or the grayscale changer 120 may be implemented in hardware. The grayscale determiner 110 and/or the grayscale changer 120 may be implemented in software. Some functions of the grayscale determiner 110 and/or the grayscale changer 120 may be configured in hardware, and other functions of the element(s) 110 and/or 120 may be implemented in software.

Figure 5A:
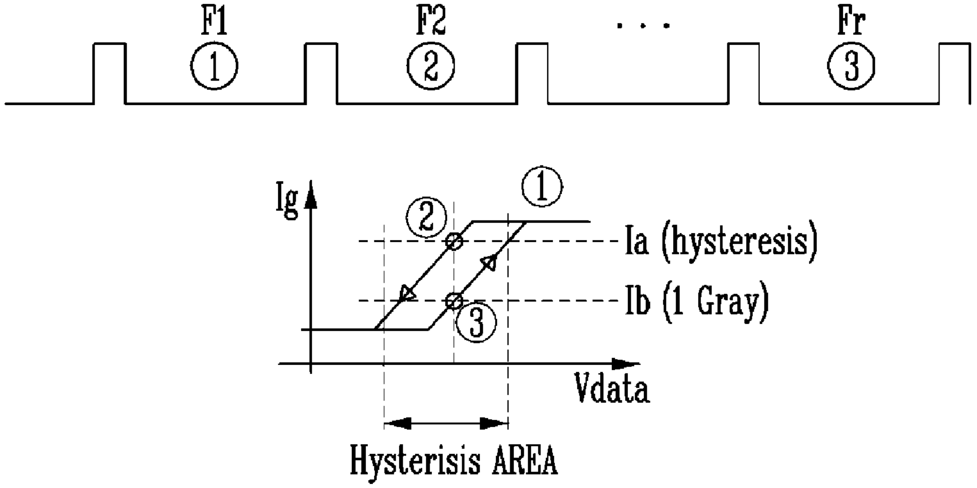
FIG. 5A is a diagram illustrating that luminance is changed from a high grayscale to a low grayscale in a pixel according to a comparative embodiment.
Figure 5B:
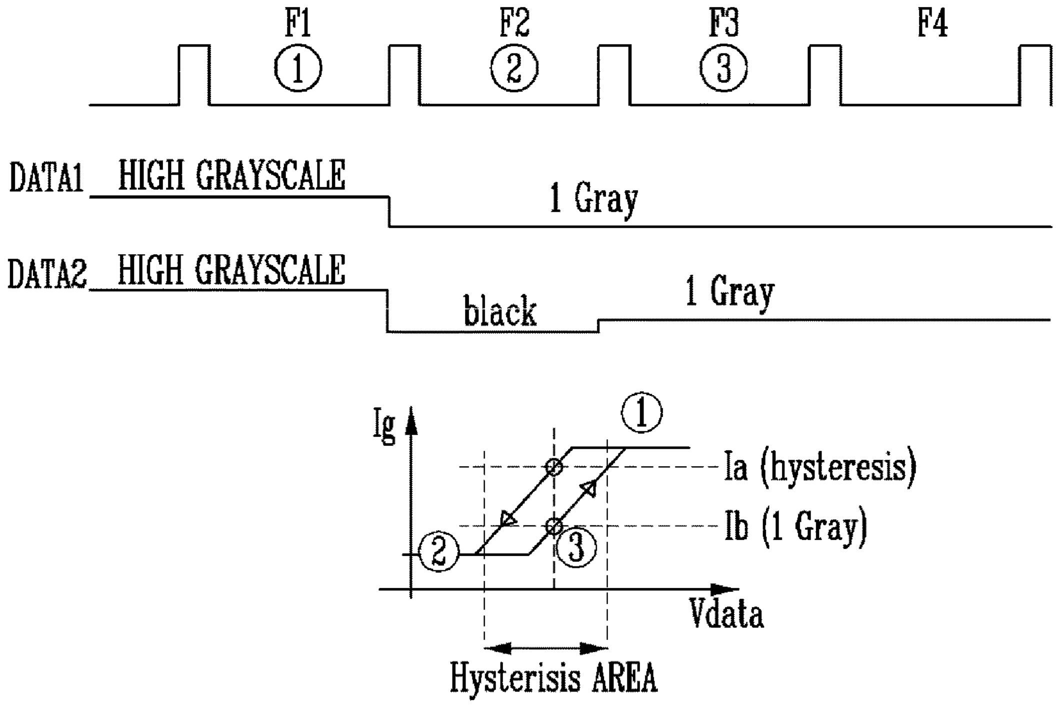
FIG. 5B is a diagram illustrating that luminance is changed from a high grayscale to a low grayscale in a pixel according to an embodiment.

FIG. 5A is a diagram illustrating that luminance is changed from a high grayscale to a low grayscale in a pixel according to a comparative embodiment. FIG. is a diagram illustrating that luminance is changed from a high grayscale to a low grayscale in a pixel according to an embodiment. In FIGS. 5A and 5B, Vdata denotes the voltage of the data signal, and Ig denotes the amount of current flowing from the driving transistor (that is, the first transistor T1 of FIG. 2) to the light emitting element.

Referring to FIG. 5A, a specific pixel receives a high grayscale data signal in a first frame F1 (or the previous frame). The specific pixel receiving the high grayscale data signal generates light of a predetermined luminance level in response to a current (a current corresponding to “1” in FIG. 5A) corresponding to the high grayscale data signal.

The specific pixel receives a low grayscale data signal, for example, a data signal corresponding to 1 grayscale (1 Gray), in a second frame F2 (or the current frame). When the voltage is changed from the high grayscale data signal to the low grayscale data signal, a current Ia (a current corresponding to “2” of FIG. 5A) higher than the current Ib corresponding to 1 grayscale (1 Gray) is provided to the light emitting element LD of the specific pixel due to the hysteresis of the driving transistor.

Thereafter, when the data signal of 1 grayscale (1 Gray) is continuously supplied to the specific pixel, after a predetermined time has elapsed in the specific pixel, the current Ib (a current corresponding to “3” of FIG. 5A) corresponding to 1 grayscale (1 Gray) is supplied in an rth frame period Fr (wherein “r” is a natural number equal to or greater than 3).

In the comparative embodiment, when the data signal of the specific pixel is changed from the high grayscale data signal to the low grayscale data signal, a desired current may not be timely supplied due to the hysteresis of the driving transistor. The driving transistor may not supply a desired current during a predetermined time, and thus an unwanted afterimage may be conspicuous to a viewer.

Referring to FIG. 5B, a specific pixel receives the high grayscale data signal in the first frame F1 (or the previous frame). The specific pixel receiving the high grayscale data signal generates light of a predetermined luminance in response to a current Ia (a current corresponding to “1” of FIG. 5B) corresponding to the high grayscale data signal.

Data to be supplied to the specific pixel during a second frame F2 (or current frame) period is low grayscale data (for example, 1 Gray). At this time, the grayscale corrector 16 generates the second data DATA2 by changing the low gray scale data to be supplied to the specific pixel to the data of the black grayscale. The data driver 12 supplies a data signal corresponding to the black grayscale to the specific pixel during the second frame F2 in response to the second data DATA2.

When the data signal of the black grayscale is supplied to the specific pixel, a current (a current corresponding to “2” of FIG. 5B) corresponding to the black data signal is supplied to the light emitting element LD of the specific pixel. The current corresponding to the black data signal may correspond to a leakage current, and the light emitting element LD may be set to a non-emission state.

Thereafter, when the data signal of 1 grayscale (1 Gray) is continuously supplied to the specific pixel, the data signal corresponding to the 1 grayscale is supplied to the specific pixel in a third frame F3 period. Then, a current Ib (a current corresponding to "3" of FIG. 5B) corresponding to 1 grayscale is supplied to the specific pixel in the third frame F3.

That is, when data to be supplied to the specific pixel is changed from the high grayscale to the low grayscale, the low grayscale data to be supplied to the specific pixel is changed to the data of the black grayscale. Then, the driving transistor included in the specific pixel may not be driven in a hysteresis area, and thus a conspicuous afterimage may be prevented. The specific pixel receiving the data of the black grayscale may display a desired grayscale during a next frame period. Although the low grayscale data is changed to the data of the black grayscale during one frame period, a luminance change may not be recognized by a user.

Figure 6:
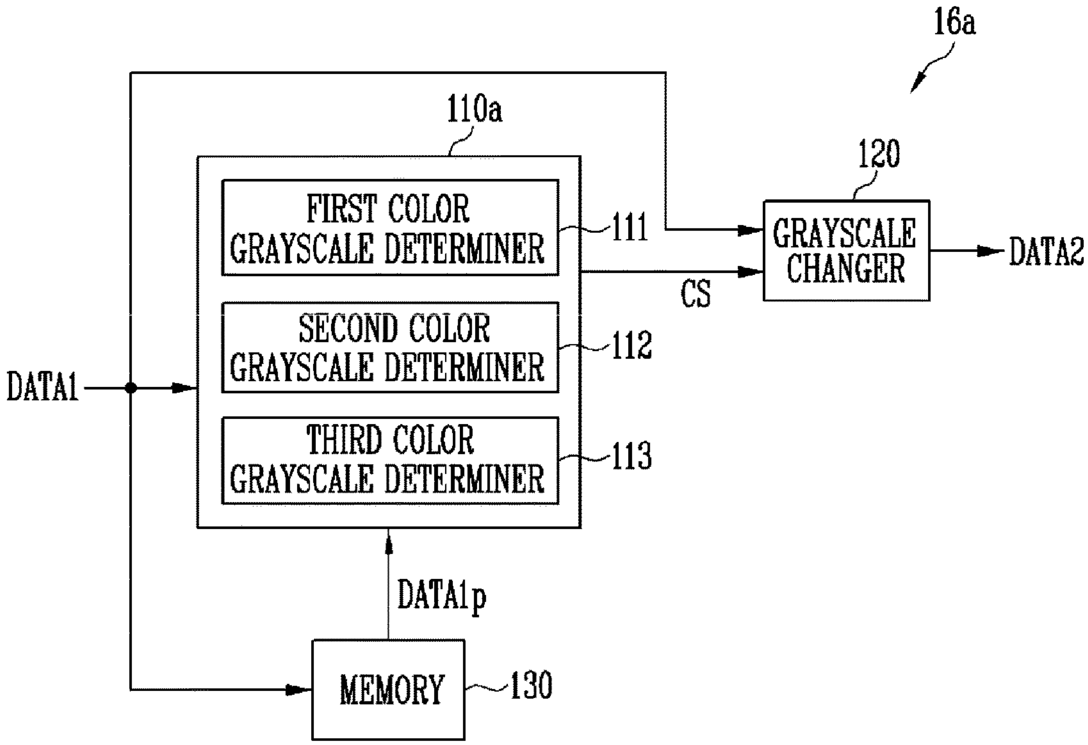
FIG. 6 is a diagram illustrating a grayscale corrector according to an embodiment.

FIG. 6 is a diagram illustrating a grayscale corrector (or grayscale unit) according to an embodiment. Some features associated with FIG. 6 may be similar to or identical to some features described with reference to FIG. 4.

Referring to FIG. 6, the grayscale corrector 16*a* may include a grayscale determiner 110*a*, a grayscale changer 120, and a memory 130.

The grayscale determiner 110*a* may compare the first data DATA1 for a pixel for the current frame with the first data DATA1*p* for the pixel for the previous frame, and may supply the control signal CS corresponding to the comparison result to the grayscale changer 120. The grayscale determiner 110*a* may compare the first data DATA1 for the pixel for the current frame with the first data DATA1*p* for the pixel for the previous frame using different grayscale ranges according to a color to be displayed by the pixel.

The grayscale determiner 110*a* includes a first color grayscale determiner 111, a second color grayscale determiner 112, and a third color grayscale determiner 113.

The first color grayscale determiner 111 may compare the first data DATA1 for the pixel for the current frame corresponding to a first color (for example, red) with the first data DATA1*p* for the pixel for the previous frame corresponding to the first color. The first color grayscale determiner 111 may determine whether a predetermined condition in which the first data DATA1*p* for the pixel for the previous frame corresponding to the first color is of a first-color high grayscale (i.e., in a predetermined second first-color grayscale range) and the first data DATA1 for the pixel for the current frame corresponding to the first color corresponding is of a first-color low grayscale (i.e., in a predetermined first first-color grayscale range between the black grayscale and the predetermined second first-color grayscale range) is satisfied. The first color grayscale determiner 111 may supply the predetermined control signal CS corresponding to the pixel to the grayscale changer 120 when the condition is satisfied.

The second color gray scale determiner 112 may compare the first data DATA1 for the pixel for the current frame corresponding to a second color (for example, green) with the first data DATA1*p* for the pixel for the previous frame corresponding to the second color. The second color grayscale determiner 112 may determine whether a condition in which the first data DATA1*p* for the pixel for the previous frame corresponding to the second color corresponding is of a second-color high grayscale (i.e., in a predetermined second second-color grayscale range) and the first data DATA1 for the pixel for the current frame corresponding to the second color is of a second-color low grayscale (i.e., in a predetermined first second-color grayscale range between the black grayscale and the predetermined second second-color grayscale range) is satisfied. The second color grayscale determiner 112 may supply the predetermined control signal CS corresponding to the pixel to the grayscale changer 120 when the condition is satisfied.

The third color grayscale determiner 113 may compare the first data DATA1 for the pixel for the current frame corresponding to a third color (for example, blue) with the first data DATA1*p* for the pixel for the previous frame corresponding to the third color. The third color grayscale determiner 113 may determine whether a condition in which the first data DATA1*p* for the pixel for the previous frame corresponding to the third color is of a third-color high grayscale (i.e., in a predetermined second third-color grayscale range) and the first data DATA1 for the pixel for the current frame corresponding to the third color is of a third-color low grayscale (i.e., in a predetermined first third-color grayscale range between the black grayscale and the predetermined second third-color grayscale range) is satisfied. The third color grayscale determiner 113 may supply the predetermined control signal CS corresponding to the pixel to the grayscale changer 120 when the condition is satisfied.

The grayscale changer 120 may generate the second data DATA2 using the first data DATA1 in response to the control signal CS of the grayscale determiner 110*a*, and may supply the generated second data DATA2 to the data driver 12. The grayscale changer 120 may generate the second data DATA2 by changing the low grayscale data to be supplied to the pixel to black data when the condition is satisfied.

Grayscale ranges for the first-color high grayscale, second-color high grayscale, and third-color high grayscale may be different from each other. Afterimages may be different for different colors to be displayed by the pixel. The light emitting material of the light emitting element LD may be selected according to the color to be displayed in the pixel, and thus the afterimage may correspond to the light emitting material.

Figure 7:
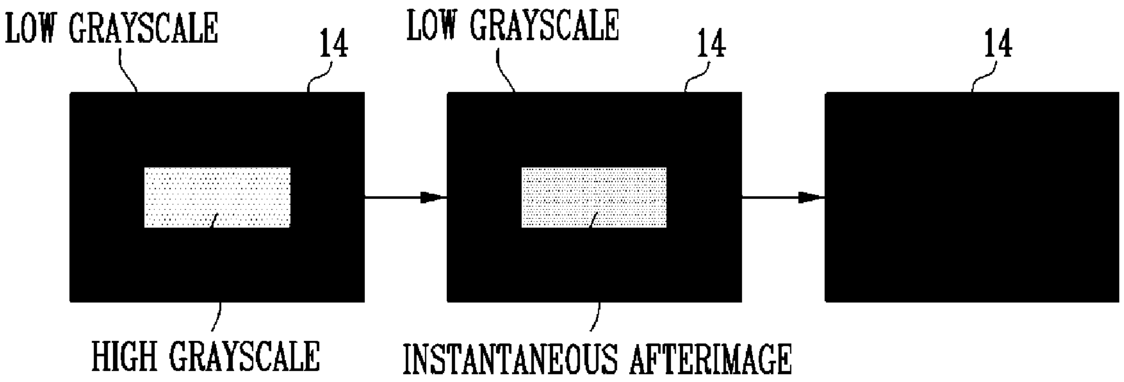
FIG. 7 is a diagram illustrating an afterimage that is displayed when some pixels display a low grayscale image portion immediately after displaying a high grayscale image portion according to an embodiment.

FIG. 7 is a diagram illustrating an afterimage that is displayed when some pixels display a low grayscale image portion immediately after displaying a high grayscale image portion according to an embodiment.

Referring to FIG. 7, in the pixel unit 14, a rectangular high grayscale image portion is displayed in a central area, and a first low grayscale image portion surrounds the high grayscale image portion. When the high grayscale image portion is changed to a second low grayscale image portion, because of the hysteresis of the driving transistors, an afterimage may be displayed at a grayscale higher than the desired low grayscale. The afterimage may include portions that appear differently in a first color pixel, a second color pixel, and a third color pixel.

TABLE 1

| | R4 | R6 | R8 | R10 | R12 | R16 | R20 |
|---|---|---|---|---|---|---|---|
| R1 | 1 | 1 | 1 | 1 | 1 | 1 | 1 |
| R2 | 1 | 1 | 1 | 1 | 1 | 1 | 1 |
| R4 | 1 | 1 | 1 | 1 | 1 | 1 | 1 |

In Table 1, R1, R2, and R4 in a column mean the second low grayscale image portion; R4, R6, R8, R10, R12, R16, and R20 in a row mean the high grayscale image portion. A number at where a column and a row meet means an afterimage duration. Each R in Table 1 means red (or the first color), and a number next to R means a grayscale. For example, R10 means 10 grayscale (10 Gray) of red. Referring to Table 1, for the first color (that is, red), when the grayscale is changed from a high grayscale (that is, R4, R6, R8, R10, R12, R16, or R20) to a low grayscale (R1, R2, or R4), the duration of the afterimage is substantially short (for example, 1 second). The predetermined high/second first-color grayscale range and the predetermined low/first first-color grayscale may reflect the afterimage duration characteristics of the first color. For example, the predetermined low/first first-color grayscale range may be 1 grayscale (1 Gray), and the predetermined high/second first-color grayscale range may be/include grayscales equal to or greater than 21 grayscale (21 Gray).

TABLE 2

| | G4 | G6 | G8 | G10 | G12 | G16 | G20 |
|---|---|---|---|---|---|---|---|
| G1 | 6 | 7 | 8 | 8 | 8 | 8 | 8 |
| G2 | 4 | 4 | 3 | 3 | 3 | 3 | 3 |
| G4 | 1 | 1 | 1 | 1 | 1 | 1 | 1 |

In Table 2, G1, G2, and G4 in a column mean the second low grayscale image portion; G4, G6, G8, G10, G12, G16, and G20 in a row mean the high grayscale image portion. A number at where a column and a row meet means an afterimage duration. Each G written in Table 2 means green (or the second color), and a number next to G means a grayscale. For example, G10 means 10 grayscale (10 Gray) of green. Referring to Table 2, for the second color (that is, green), when the grayscale is changed from a high grayscale (that is, G4, G6, G8, G10, G12, G16, or G20) to a low grayscale (G1, G2, or G4), the duration of the afterimage may depend on the high grayscale and the low grayscale. For example, when the grayscale is changed from green 20 grayscale (20 Gray, G20) to green 1 grayscale (1 Gray, G1), the duration of the afterimage may be 8 seconds. In addition, when the grayscale is changed from green 20 grayscale (20 Gray, G20) to green 2 grayscale (2 Gray, G2), the duration of the afterimage may be 3 seconds. The predetermined high/second second-color grayscale range and the predetermined low/first second-color grayscale range may reflect the afterimage duration characteristics of the second color. For example, the predetermined low/first second-color grayscale range may be/include grayscales equal to or less than 2 grayscale (2 Gray), and the predetermined high/second second-color grayscale range may be/include grayscales equal to or greater than 4 grayscale (4 Gray).

TABLE 3

| | B4 | B6 | B8 | B10 | B12 | B16 | B20 |
|---|---|---|---|---|---|---|---|
| B1 | 16 | 17 | 18 | 18 | 18 | 18 | 18 |
| B2 | 6 | 6 | 6 | 6 | 6 | 6 | 6 |
| B4 | 1 | 1 | 1 | 1 | 1 | 1 | 1 |

In Table 3, B1, B2, and B4 in a column mean the second low grayscale image portion; B4, B6, B8, B10, B12, B16, and B20 in a row mean the high grayscale image portion. A number at where a column and a row meet means an afterimage duration. Each B in Table 3 means blue, and a number next to B means a grayscale. For example, B10 means 10 grayscale (10 Gray) of blue. Referring to Table 3, for the third color (that is, blue), when the grayscale is changed from a high grayscale (that is, B4, B6, B8, B10, B12, B16, or B20) to a low grayscale (B1, B2, or B4), the afterimage duration may depend on the high grayscale and the low grayscale. For example, when the grayscale is changed from blue 20 grayscale (20 Gray, B20) to blue 1 grayscale (1 Gray, B1), the afterimage duration may 18 seconds. In addition, when the grayscale is changed from blue 20 grayscale (20 Gray, B20) to blue 2 grayscale (2 Gray, B2), the afterimage duration may be 6 seconds. The predetermined high/second first-color grayscale range and the predetermined low/first third-color grayscale range may reflect the afterimage duration characteristics of the third color. For example, the predetermined low/first third-color grayscale range may be/include grayscales equal to or less than 2 grayscale (2 Gray), and the predetermined high/second third-color grayscale range may be/include grayscales equal to or greater than 4 grayscale (4 Gray).

As described above, the afterimage duration may depend on the color (for example, red, green, or blue) displayed by the pixel. Therefore, the grayscale corrector 16*a* may generate the second data DATA2 according to the color displayed by the pixel.

Referring to Table 1, for the first color pixel, the afterimage duration is substantially short. Therefore, the first data DATA1 corresponding to the first color may be used as the second data DATA2 of the first color to be output without changes to the grayscale. The first color grayscale determiner 111 shown in FIG. 6 may be optional.

The lowest/minimum grayscale of the predetermined high/second first-color grayscale range may be set higher than each of the lowest/minimum grayscale of the predetermined high/second second-color grayscale range and the lowest/minimum grayscale of the predetermined high/second third-color grayscale range. For example, the lowest grayscale of the predetermined high/second first-color grayscale range may be 21 grayscale (21 Gray), and the lowest grayscale of the predetermined high/second second-color grayscale range and the lowest grayscale of the predetermined high/second third-color grayscale range may each be 4 grayscale (4 Gray).

As shown in Tables 2 and 3, an afterimage duration of a pixel of the third color may be longer than that of a pixel of the second color. Therefore, the lowest/minimum grayscale of the predetermined high/second third-color grayscale range may be set lower than the lowest/minimum grayscale of the predetermined high/second second-color grayscale range. The predetermined high/second first-color grayscale range, the predetermined high/second second-color grayscale range, and the predetermined high/second third-color grayscale range may be set different from each other according to the characteristics, resolution, and the like of the display panel, and may be determined experimentally.

The predetermined low/first first-color grayscale range, the predetermined low/first second-color grayscale range, and the predetermined low/first third-color grayscale range may be set different from each other. For example, the highest/maximum grayscale of the predetermined low/first first-color grayscale range may be set lower than each of the highest/maximum grayscale of the predetermined low/first second-color grayscale range and the highest/maximum grayscale of the third predetermined low/first grayscale range. For example, the highest/maximum grayscale of the predetermined low/first first-color grayscale range may be 1 grayscale (1 Gray), and the highest/maximum grayscale of the predetermined low/first second-color grayscale range and the highest/maximum grayscale of the predetermined low/first third-color grayscale range may each be 2 grayscale (2 Gray). The predetermined low/first first-color grayscale range, the predetermined low/first second-color grayscale range, and the predetermined low/first third-color grayscale range may be set different from each other according to the characteristics, resolution, and the like of the display panel, and may be determined experimentally.

Figure 8:
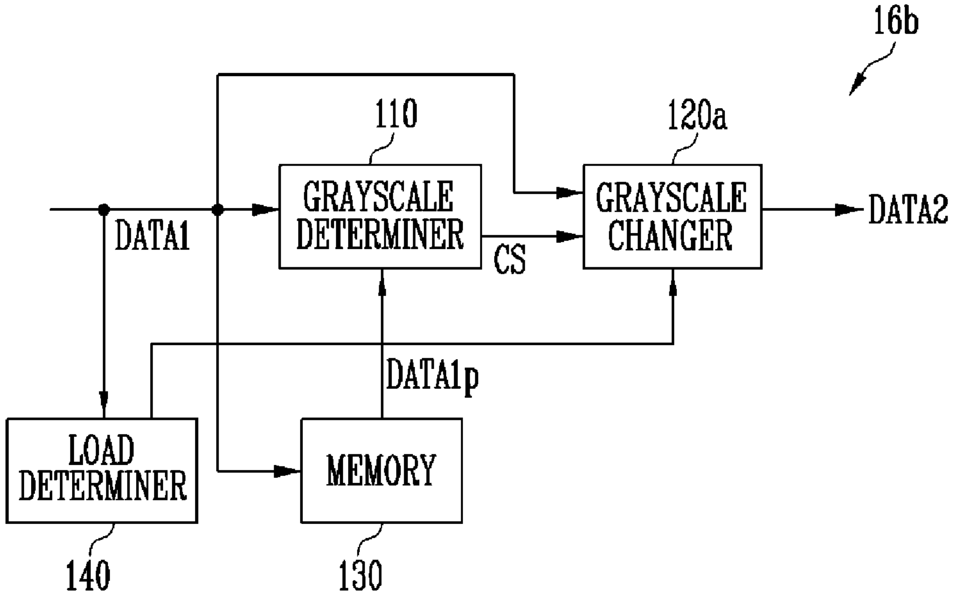
FIG. 8 is a diagram illustrating a grayscale corrector according to an embodiment.

FIG. 8 is a diagram illustrating a grayscale corrector (or grayscale unit) according to an embodiment. Some features associated with FIG. 8 may be similar to or identical to some of the features described with reference to FIG. 4.

Referring to FIG. 8, the grayscale corrector 16*b* includes a grayscale determiner 110, a grayscale changer 120*a*, a memory 130, and a load determiner 140.

The load determiner 140 may determine a load of the current frame using the first data DATA1 of the current frame. The load determiner 140 determines whether the first data DATA1 of the current frame is equal to or greater than a predetermined threshold value. The threshold value may be set in a range of 50% to 80% when a full white load is 100%. When the load determiner 140 determines that the first data DATA1 of the current frame is equal to or greater than the threshold value, the load determiner 140 may supply a load control signal to the grayscale changer 120*a*.

The grayscale changer 120*a* may output the first data DATA1 of the current frame as the second data DATA2 regardless of a determination result of the grayscale determiner 110 when the load control signal is supplied from the load determiner 140.

In general, when the load of the frame is the threshold value or more, the load determiner 140 may determine that a bright image is displayed in the pixel unit 14, such that the instantaneous afterimage will not be recognized by the viewer at the low grayscale. Therefore, when the load control signal is input from the load determiner 140, the first data DATA1 of the current frame may be output as the second data DATA2, regardless of the determination result of the grayscale determiner 110.

Figure 9:
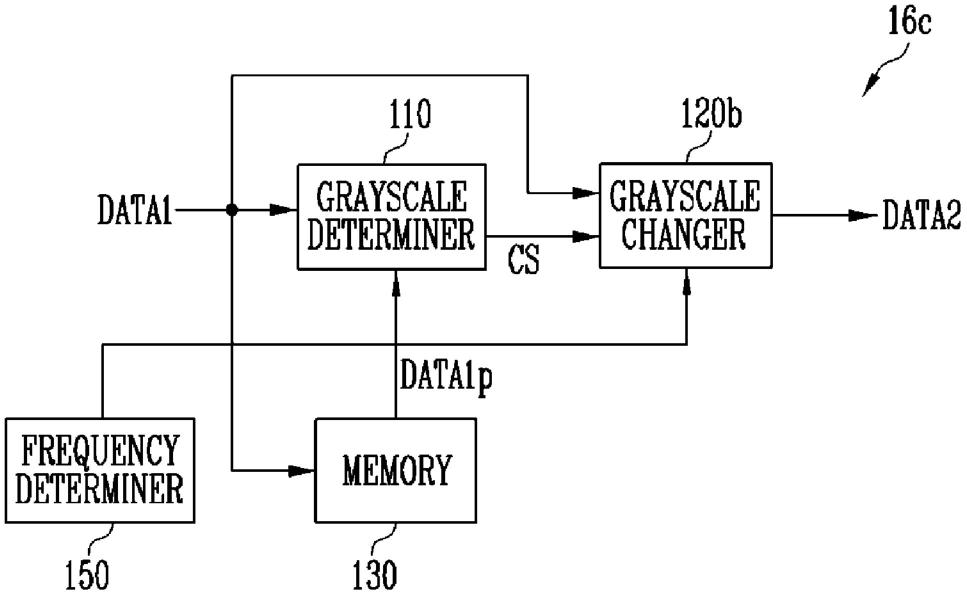
FIG. 9 is a diagram illustrating a grayscale corrector according to an embodiment.

FIG. 9 is a diagram illustrating a grayscale corrector (or grayscale unit) according to an embodiment. Some features associated with FIG. 9 may be similar to or identical to some of the features described with reference to FIG. 4.

Referring to FIG. 9, the grayscale corrector 16*c* includes a grayscale determiner 110, a grayscale changer 120*b*, a memory 130, and a frequency determiner 150.

The frequency determiner 150 may determine a/the frequency of the current frame and may supply a frequency control signal to the grayscale changer 120*b* in response to a determination result. For example, when frequency determiner 150 determines that the frequency of the current frame is equal to or lower than a threshold value, the frequency determiner 150 may supply the frequency control signal to the grayscale changer 120*b*. The threshold value may be set equal to or less than 100 Hz. The frequency determiner 150 may determine the frequency of the current frame using one or more currently known methods. The frequency determiner 150 may determine the frequency using a vertical synchronization signal (Vsync), or may determine the frequency using a frequency determination signal supplied from an external device.

The grayscale changer 120*b* may output the first data DATA1 of the current frame as the second data DATA2 regardless of the determination result of the grayscale determiner 110 when the frequency control signal is supplied from the frequency determiner 150. In general, when the pixel unit 14 is driven at a low frequency, a black grayscale image additionally inserted into the second data DATA2 may be unwantedly recognized by the viewer. Therefore, when the frequency control signal is input from the frequency determiner 150, the first data DATA1 of the current frame may be output as the second data DATA2, regardless of the determination result of the gray scale determiner 110.

Although examples of embodiments have been described, those skilled in the art will understand that the described embodiments may be modified in various ways without departing from the scope specified by the claims.

What is claimed is:

1. A display device comprising:

a timing controller configured to generate first data for a pixel for a previous frame and first data for the pixel for a current frame; and a grayscale unit electrically connected to the timing controller and configured to output a black-corresponding grayscale as second data for the pixel when a predetermined condition is satisfied, wherein the black-corresponding grayscale corresponds to black, wherein the predetermined condition includes that the first data for the pixel for the previous frame is in a predetermined second grayscale range and that the first data for the pixel for the current frame is in a predetermined first grayscale range, and wherein the predetermined first grayscale range is between the predetermined second grayscale range and the black-corresponding grayscale.

2. The display device according to claim 1, wherein the predetermined first grayscale range includes a first grayscale immediately next to the black grayscale.

3. The display device according to claim 2, wherein a minimum grayscale of the predetermined second grayscale range is greater than a maximum grayscale of the predetermined first grayscale range.

4. The display device according to claim 1, wherein the grayscale unit outputs the first data for the pixel for the current frame as the second data for the pixel when the predetermined condition is not satisfied.

5. The display device according to claim 1, wherein the grayscale unit comprises:

a memory configured to store the first data for the pixel for the previous frame;

a grayscale determiner configured to receive the first data for the pixel for the current frame from the timing controller, receive the first data for the pixel for the previous frame from the memory, and determine whether the predetermined condition is satisfied; and a grayscale output unit configured to output the second data for the pixel in response to a determination result of the grayscale determiner.

6. The display device according to claim 5, wherein the grayscale determiner comprises:

a first color grayscale determiner for determining whether predetermined first-color condition is satisfied using a predetermined second first-color grayscale range corresponding to a first color and using a predetermined first first-color grayscale range corresponding to the first color and lower than the predetermined second first-color gray scale range;

a second color grayscale determiner for determining whether a predetermined second-color condition is satisfied using a predetermined second second-color grayscale range corresponding to a second color and using a predetermined first second-color grayscale range corresponding to the second color and lower than the predetermined second second-color grayscale range; and a third color grayscale determiner for determining whether a predetermined third-color condition is satisfied using a predetermined second third-color grayscale range corresponding to a third color and using a predetermined first third-color grayscale range corresponding to the third color and lower than the predetermined second third-color grayscale range.

7. The display device according to claim 6, wherein the predetermined second first-color grayscale range, the predetermined second second-color grayscale range, and the predetermined second third-color grayscale range are different from each other.

8. The display device according to claim 6, wherein the first color is red, wherein the second color is green, and wherein a lowest grayscale of the predetermined second first-color grayscale range is higher than a lowest grayscale of the predetermined second second-color grayscale range.

9. The display device according to claim 8, wherein the third color is blue, and wherein a lowest grayscale of the predetermined second third-color grayscale range is lower than the lowest grayscale of the predetermined second second-color grayscale range.

10. The display device according to claim 1, wherein when the pixel is configured to display a predetermined color, the grayscale unit outputs the first data for the pixel for the current frame as the second data for the pixel regardless of whether the predetermined condition is satisfied.

11. The display device according to claim 10, wherein the predetermined color is red.

12. The display device according to claim 1, further comprising:

a load determiner configured to determine a load of the current frame using the first data for the pixel for the current frame.

13. The display device according to claim 12, wherein the grayscale unit outputs the first data for the pixel for the current frame as the second data for the pixel when the load determiner determines that the load of the current frame is equal to or greater than a predetermined threshold value.

14. The display device according to claim 13, wherein the predetermined threshold value is in a range of 50% to 80%.

15. The display device according to claim 1, further comprising:

a frequency determiner configured to determine a driving frequency of the current frame.

16. The display device according to claim 15, wherein the grayscale unit outputs the first data for the pixel for the current frame as the second data for the pixel when the frequency determiner determines that the driving frequency of the current frame is equal to or lower than a predetermined threshold frequency.

17. The display device according to claim 16, wherein the predetermined threshold frequency is 100 Hz.

18. A method of driving a display device, the method comprising:

generating, using a timing controller, first data for a pixel for a previous frame and first data for the pixel for a current frame; and outputting, using a grayscale unit electrically connected to the timing controller, a black-corresponding grayscale as second data for the pixel when a predetermined condition is satisfied, wherein the black-corresponding grayscale corresponds to black, wherein the predetermined condition comprises that the first data for the pixel for the previous frame is in a predetermined second grayscale range and that the first data for the pixel for the current frame is in a predetermined first grayscale range, and wherein the predetermined first grayscale range is between the predetermined second grayscale range and the black-corresponding grayscale.

19. The method according to claim 18, wherein the predetermined first grayscale range includes a first grayscale immediately next to the black grayscale.

20. The method according to claim 18, comprising:

determining at least one of a driving frequency of the current frame and a load of the current frame; and outputting the first data for the pixel for the current frame as the second data for the pixel when the driving frequency of the current load is 100 Hz or less or when the load of the current frame is 80% or more.

* * * * *